Aug. 28, 1923.

C. REES ET AL 1,466,383

RADIATOR FOR DRYING APPARATUS

Filed Sept. 7, 1920

INVENTORS
Claude Rees
Charles F. Hine.

By White Pint & Evans
their ATTORNEYS

Patented Aug. 28, 1923.

1,466,383

UNITED STATES PATENT OFFICE.

CLAUDE REES AND CHARLES F. HINE, OF SAN FRANCISCO, CALIFORNIA.

RADIATOR FOR DRYING APPARATUS.

Application filed September 7, 1920. Serial No. 408,703.

*To all whom it may concern:*

Be it known that we, CLAUDE REES and CHARLES F. HINE, citizens of the United States, and residents of the city and county of San Francisco, State of California, have invented a new and useful Radiator for Drying Apparatus, of which the following is a specification.

This invention relates to fruit drying apparatus and more particularly to a radiator for fruit evaporators.

It is one of the objects of the present invention to provide a highly efficient, simple, practicable and inexpensive type of radiator to be installed and operated in connection with various drying apparatus, such, for instance, as fruit evaporators.

A further object of the invention is to provide an improved radiator structure for the conservation of the heat units in the by-products of combustion, or in heated air.

Particularly it is one of the objects of the present invention to provide a novel arrangement and construction of radiator members, whereby the transverse area of a course through which the heated medium is directed substantially decreases toward the terminal of the course to decrease the volume of the passage substantially in proportion to the decrease of heat in the heated medium.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description, as variations may be adopted within the scope of the invention as set forth in the claims.

In the drawings, Figure 1 is a side elevation and sectional view of the preferred form of the heater connected with a furnace.

Figure 3 is a horizontal section on line 3—3 of Figure 2 looking down, and Figure 4 is a section on line 4—4 looking up.

Figure 1:
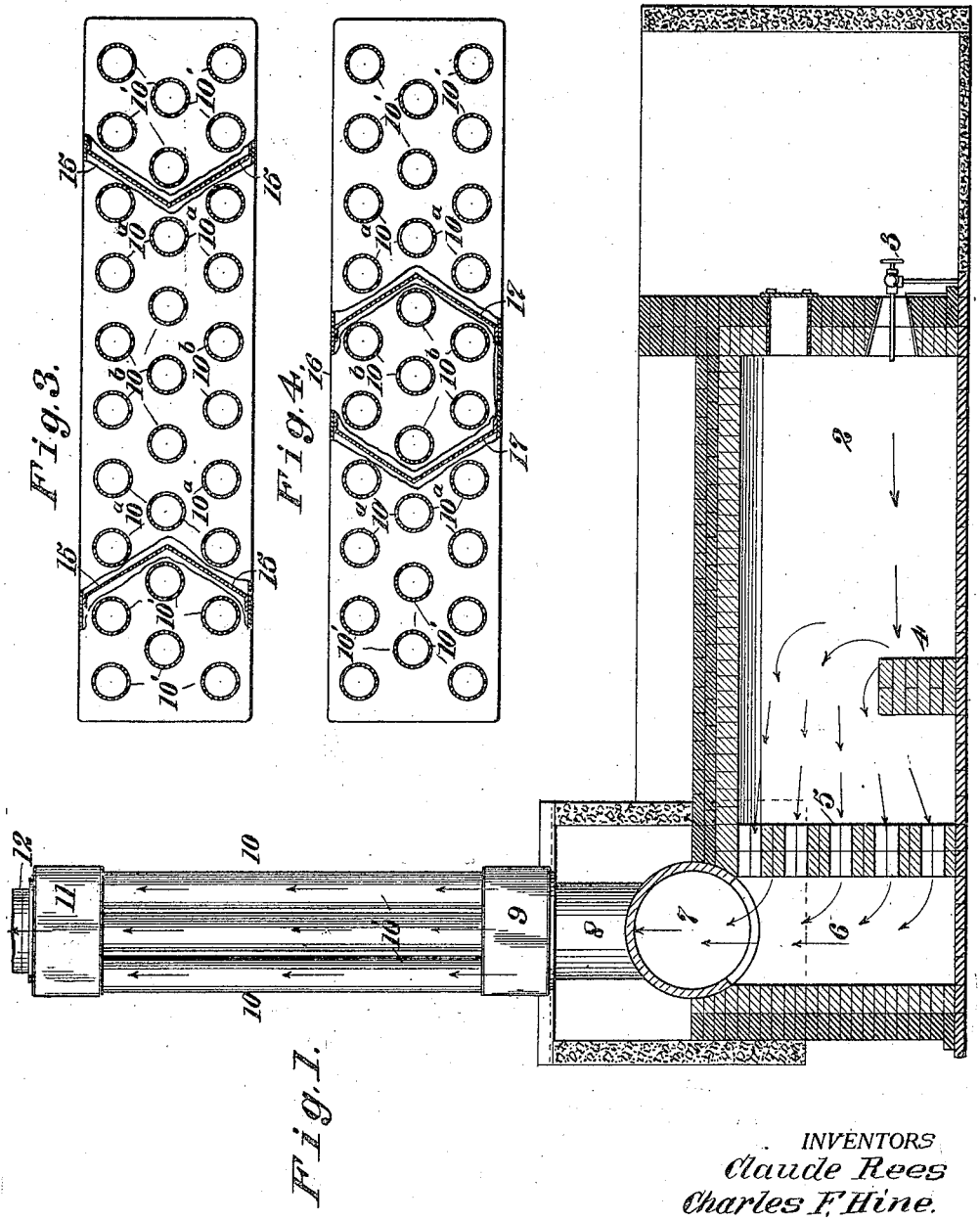
Figure 2:
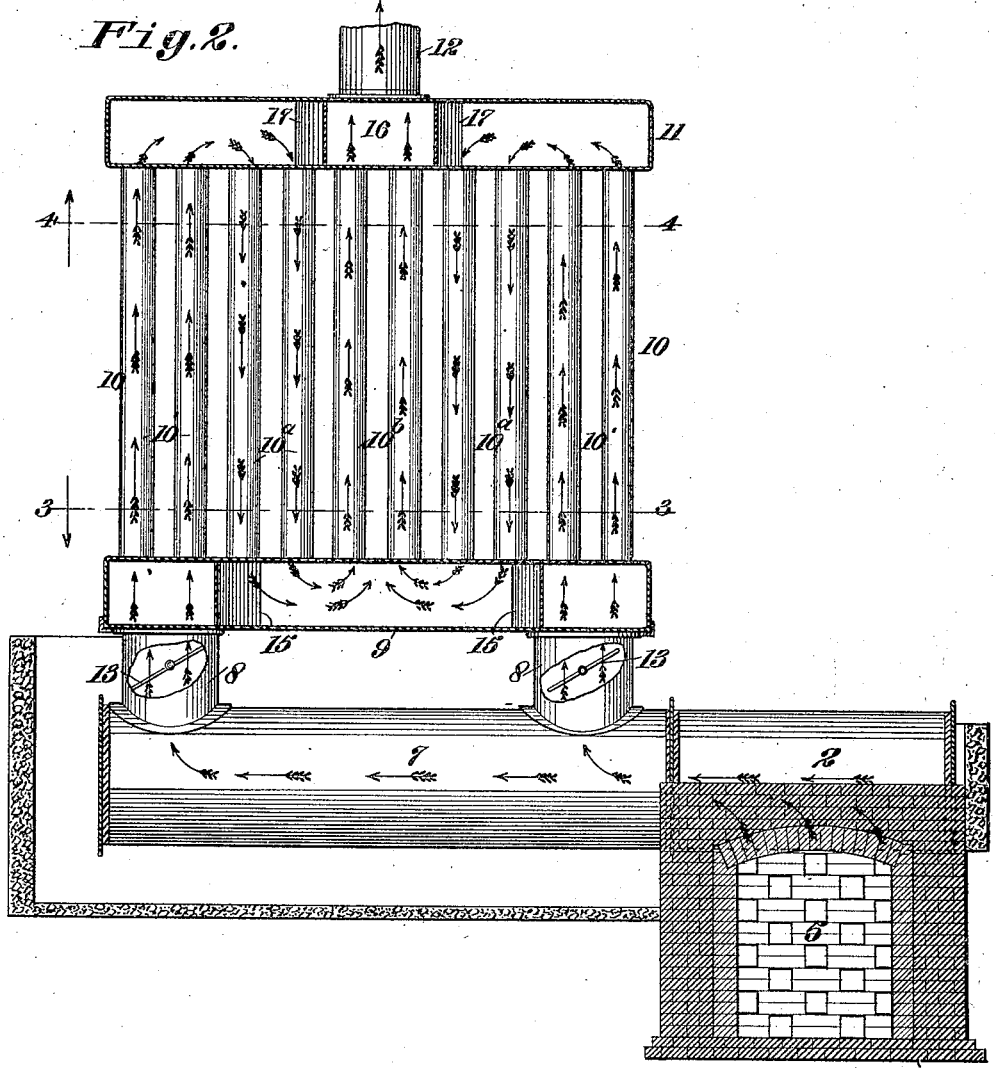
Figure 2 is a section and elevation in a plane at right angles to Figure 1.

In the preferred embodiment of the present invention, the heat units derived by radiation from heated products of combustion, or hot air, are conserved and utilized in the heating of an apparatus such, for instance, as a fruit evaporator, by causing the heated medium to flow from a given source, as a furnace, into a radiator structure, which provides a course of flow for the heated medium with sections of the course of successively and respectively decreasing transverse area so that the capacity of the sections decreases as the heat of the heated medium decreases in its flow toward the end of the course.

The radiator preferably consists of spaced, superposed intake and discharge manifolds connected by a series of flues, the whole constructed of a material for the effective radiation of the heat. In securing the advantageous radiation, the manifolds are connected by a series of flues forming a circuitous course leading from separate inlets and converging in branches toward a common discharge; the flues being arranged in groups, the aggregate area of each group in a branch between the intake and the discharge of the radiator gradually decreasing in sections. Further, means are provided for controlling the flow of the heated medium into the intake manifold so as to insure a substantially uniform heating of the radiator and prevent the tendency of the heated medium to follow the course of least resistance or most direct route through the radiator.

The heater may be supplied with heat derived from any suitable source, as a furnace 2, in which fire may be maintained by the combustion of fuel, as from an oil burner 3. Within the furnace there may be provided a fire back 4, toward which the flame from the burner is directed and over which it passes with the products of combustion, toward a checker-board back wall 5 leading into a horizontal chamber 6, in which there is disposed a drum 7 for the hot fases or air. This drum may be in the form of a cylinder having stand pipes 8—8 at each end discharging into a manifold 9, preferably of material forming a thin wall for the ready radiation of heat.

Extending upwardly from the top of the manifold 9 is a series of flues 10 terminating at their upper ends in a horizontal, upper outlet or head manifold 11, from the center of which is extended a smoke or discharge stack 12.

To control the flow of the heated medium into the lower manifold 9 in a uniform manner, suitable dampers or regulators are utilized and may consist of shutters 13, mounted for adjustment in the stand pipes 8—8 of the drum 7.

For the purpose of securing the gradual reduction of the area of the course through which the heated medium passes from the drum 7 to the outlet stack 12, the radiator structure is preferably formed with a plurality of rows of the flues 10, and these rows are divided into groups, each of the groups being in the aggregate area of its respective flues, of smaller transverse area in successive groups from the intake manifold to the outlet of the outlet manifold. Such a progressive reduction in the capacity of the course through the radiator may be readily secured by the arrangement of groups, as shown in Fig. 3, wherein at each end of the intake manifold there is formed an initial group consisting of six flues designated at 10' each. To secure this division of a group of six flues at each end of the intake manifold, the latter is provided with an interior dividing wall 15, extending across the manifold 9, and thus dividing off at each end of the manifold a cluster or group of six flues.

As shown in Fig. 3, the rows of flues extend longitudinally with respect to the manifolds and the rows are offset or staggered with relation to each other so as to maintain a substantially equal distance between each of the flues, and, therefore, the transverse partition walls 15 are bent angularly toward each other in accordance with the offset of the middle row of the flues with respect to the outer row, in cases when, as illustrated, there are three longitudinal rows of flues in each structure.

Thus, heated products of combustion pass immediately from the stand pipes 8—8 into the end groups of flues, and, rising through the same, are then diverted downwardly into a contiguous group consisting of five of the flues, designated 10$^a$ in Fig. 4; there being two of such groups, one adjacent each outer and initial group of flues 10'. The heated medium passing downwardly through the groups 10$^a$, again enters the intake manifold 9 and the separate branches of the flowing medium move centrally and toward each other so as to pass into a central and discharge group of the flues, which are designated 10$^b$, and the upper ends of which flues discharge into a chamber 16 formed between transverse partition walls 17, which, therefore, divide the central group of flues 10$^b$ from the terminals of the flues 10' and 10$^a$ laterally thereof in the head manifold 11.

In the present organization there is at each end of the series of flues a group each consisting of six vertical flues, thus aggregating twelve in number; the intermediate groups of flues aggregate ten flues 10$^a$, five in each group, and the center group consists of seven flues 10$^b$. Therefore, it will be seen that the central discharge group of flues 10$^b$ is but slightly more than one-half of the transverse area of the groups of flues 10' (all of the flues being of the same diameter), while the aggregate area of the flues 10$^a$ is less than the aggregate area of the flues 10', but greater than the aggregate area of the flues 10$^b$, so that there is a gradual reduction in the capacity of the radiator passageways from the initial to the terminal group.

By the diversion of the heated medium into a plurality of branches converging toward a common central discharge path, it will be seen that a more uniform radiation of heat and heating of the radiator is secured than would be the case if all of the heated medium were caused to flow through a single course of travel from the intake to the discharge of the radiator.

What is claimed is:

1. A radiator structure for a drying apparatus, comprising an intake manifold and an outlet manifold in superposed spaced relation, and a series of flues connecting the manifolds and grouped to form separate circuitous courses back and forth between the manifolds, each course having a separate inlet source.

2. A radiator structure for a drying apparatus, comprising an intake manifold and an outlet manifold in superposed, spaced relation, and a series of flues connecting the manifolds and grouped to form a circuitous course back and forth between the manifolds, the course being of decreasing transverse area toward its outlet.

3. A radiator structure for a drying apparatus, comprising an intake manifold and an outlet manifold in superposed, spaced relation, and a series of flues connecting the manifolds and grouped to form a circuitous course back and forth between the manifolds, the successive groups in the course being of decreasing transverse area.

4. A radiator structure for a drying apparatus, comprising an intake manifold and an outlet manifold in superposed, spaced relation, and a series of flues connecting the manifolds and grouped to form a circuitous course back and forth between the manifolds, the successive groups in the course being of decreasing transverse area, the course including a succession of sections which decrease, respectively, in cross-area to the outlet.

5. A radiator structure for a drying apparatus, comprising an intake manifold and an outlet manifold in superposed, spaced relation, and a series of flues connecting the manifolds and grouped to form a circuitous course back and forth between the manifolds, the successive groups in the course being of decreasing transverse area, the course including a succession of flue groups which decrease, respectively, in cross-area to the outlet.

6. A radiator structure for a drying apparatus, comprising an intake manifold and an outlet manifold, and a series of flues connecting the manifolds and forming independent circuitous courses, each leading from its end of the intake manifold and converging into a common outlet path.

In testimony whereof, we have hereunto set our hands.

CLAUDE REES.
CHARLES F. HINE.